Nov. 1, 1938.　　　　O. B. CLARK　　　　2,134,858
CLAMPING DEVICE
Filed Aug. 9, 1937
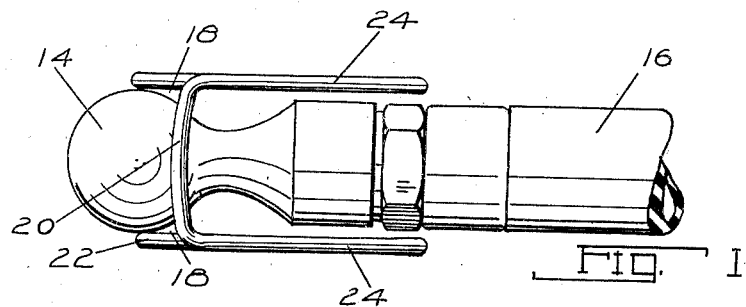
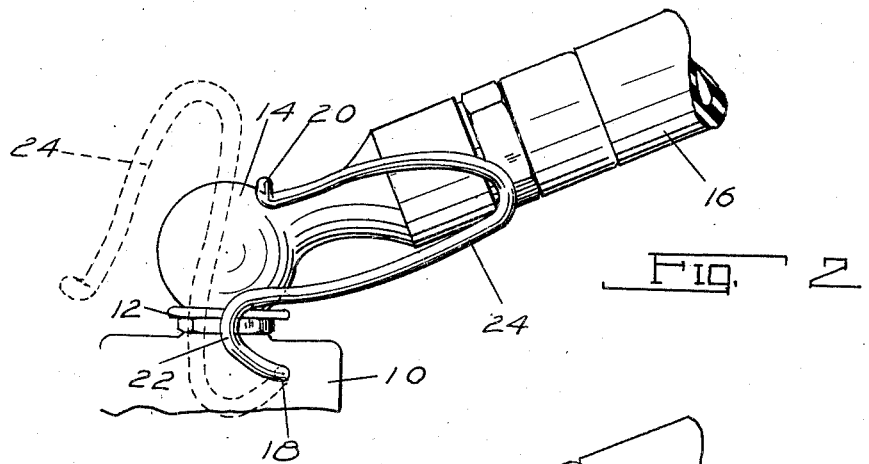
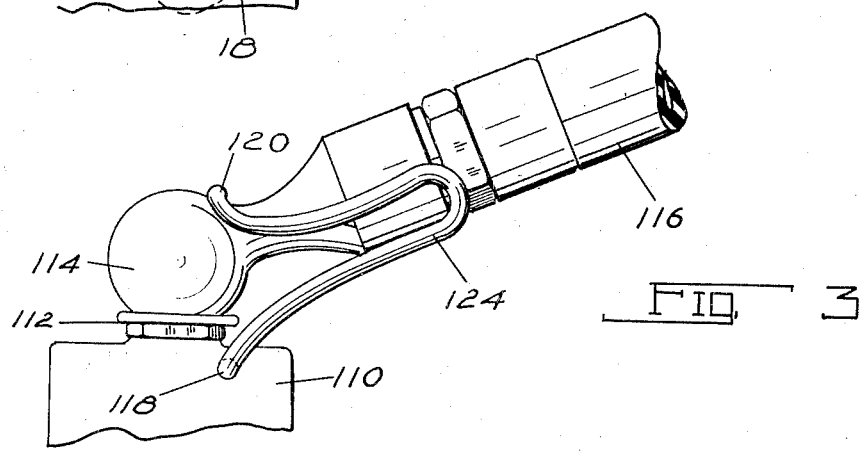
INVENTOR.
OTTO B. CLARK
BY McConkey Dawson & Booth
ATTORNEYS.

Patented Nov. 1, 1938

2,134,858

UNITED STATES PATENT OFFICE 2,134,858

CLAMPING DEVICE

Otto B. Clark, Chicago, Ill., assignor to The Lubrication Corporation, Chicago, Ill., a corporation of Delaware Application August 9, 1937, Serial No. 158,096

4 Claims. (Cl. 285—91)

This invention relates to clamping devices and more particularly to devices for clamping air chucks to air using apparatus.

One of the objects of the invention is to provide a clamp which is extremely simple to construct, which is quick and easy to operate, and which forms a tight and reliable connection.

Another object of the invention is to provide a clamp which will limit swinging movement of an air chuck relative to an air using device.

Other objects and advantages of the invention will be apparent from the following description of the accompanying drawing, in which:

Figure 1 is a top view of an air chuck and a clamp embodying the invention;

Figure 2 is a side view of the device of Figure 1, and

Figure 3 is a view similar to Figure 2 of a slightly modified construction.

The clamp of the present invention is intended for use with an air operated vacuum cleaner, an air operated grease gun or any other air using device indicated generally at 10 and having a nipple 12 formed for sealing engagement with an air chuck 14 of conventional form. The air chuck is supplied with air through a hose 16 from any suitable source and is adapted sealing to engage the nipple 12 as shown in such a manner that it may be swung about a vertical axis passing through the center of the nipple and chuck.

According to the present invention the air chuck is secured to the device 10 by a clamp formed of an elongated piece of spring wire having its ends turned in and journaled in suitable openings in the device 10 as indicated at 18. The central portion 20 of the piece lies substantially parallel to the axis of the pivots 18 and is adapted to engage the top of the chuck 14 and press it against the nipple 12.

Since the chuck can swing about the nipple it will be apparent that the shank portion of the chuck might engage the wire piece and cam it out of clamping engagement with the chuck to release the same. This is prevented according to the present invention by forming the intermediate portions of the wire piece into a substantially S-shape with forwardly projecting loops 22 and rearwardly projecting loops 24. Te loops 24 lie on opposite sides of the chuck adjacent its point of connection with the hose 16 and will serve to limit swinging movement thereof about the nipple 12 to prevent the shank portion of the chuck from camming the portion 20 of the wire piece out of engagement with the chuck head.

The loops 22 are provided primarily to increase the length of the spring wire from each end to the center so that the necessary amount of resiliency can be obtained. These loops may be omitted as indicated in Figure 3 in which parts corresponding to like parts in Figure 2 have been indicated by the same reference numerals plus 100. It will be noted, however, that in this figure the loops 124 have been retained to limit swinging movement of the chuck.

To use the illustrated clamp, it is first swung to the dotted position of Figure 2 and the chuck is placed on the nipple. The clamp is then swung back to the full line position, springing the portion 20 thereof over the head of the chuck to clamp the chuck firmly on the nipple. To remove the chuck, the clamp may be swung to the dotted line position.

While two embodiments of the invention have been shown and described in detail it will be apparent that changes might be made therein and it is not intended that the scope of the invention shall be limited to the exact forms shown nor otherwise than by the terms of the appended claims.

What is claimed is:

1. An air chuck clamp comprising an elongated spring member having means for pivotally mounting it on an air using device and a central portion adapted to engage an air chuck and portions lying on opposite sides of the air chuck to limit rotation thereof on the device.

2. An air chuck clamp comprising an elongated piece of spring wire having its ends formed for pivotal mounting on an air using device and its central portion formed to engage the top of an air chuck and hold it on said device, the intermediate portions of said wire being bent into a substantially U-shape adapted to lie alongside of said chuck to limit swinging movement thereof on said device.

3. An air chuck clamp comprising a resilient member adapted to be pivotally mounted on an air using device and including a portion resiliently connected to said device and formed for clamping engagement with an air chuck to clamp it to the device, said member having portions adapted to lie on opposite sides of the air chuck to limit swinging movement thereof about its point of connection with the device.

4. In combination with an air using device and an air chuck for supplying air thereto, a clamp comprising an elongated resilient member pivotally connected at its ends to the device, the center portion of said member being formed for clamping engagement with an air chuck to clamp it to the device and the intermediate portions of the member lying beside the chuck to limit swinging movement thereof.

OTTO B. CLARK.